US009817124B2

(12) United States Patent
Takemura et al.

(10) Patent No.: US 9,817,124 B2
(45) Date of Patent: Nov. 14, 2017

(54) DISTANCE MEASURING APPARATUS

(71) Applicant: Kabushiki Kaisha Toshiba, Minato-ku, Tokyo (JP)

(72) Inventors: Shota Takemura, Fuchu Tokyo (JP); Kenji Aizawa, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 423 days.

(21) Appl. No.: 14/554,554

(22) Filed: Nov. 26, 2014

(65) Prior Publication Data

US 2015/0260845 A1    Sep. 17, 2015

(30) Foreign Application Priority Data

Mar. 11, 2014    (JP) .................. 2014-047817

(51) Int. Cl.
*G01S 17/48* (2006.01)
*G01S 7/481* (2006.01)

(52) U.S. Cl.
CPC ............ *G01S 17/48* (2013.01); *G01S 7/4815* (2013.01)

(58) Field of Classification Search
CPC ......... B25B 5/06; B25B 5/147; G01B 5/0004; G01B 11/25; G01B 11/2531;
(Continued)

(56) References Cited

U.S. PATENT DOCUMENTS 3,554,646 A    1/1971 Carlson
5,374,985 A    12/1994 Beadles et al.
(Continued)

FOREIGN PATENT DOCUMENTS

CN    103292710 A    9/2013
JP    2011-196883 A    10/2011
(Continued)

OTHER PUBLICATIONS

Notice of Office Action for the corresponding Taiwanese patent application No. 103137243, dated Sep. 8, 2015, 5 pages.

*Primary Examiner* — Luke Ratcliffe
(74) *Attorney, Agent, or Firm* — Knobbe, Martens, Olson & Bear LLP

(57) ABSTRACT

A distance measuring apparatus is characterized in that: a detection unit 1 is provided with a light beam generating unit 12 which is provided with a plurality of light beam generation optical units each of which is provided with a laser light source, and a collimator, and a light beam lighting control unit which generates pulse signals for lighting laser beams as pulse lights in time series, a camera unit 11 which generates position detection information of a plurality of the laser beams, and an optical setting unit 13 which sets the light beam generating unit and the camera unit; and projects the plurality of laser beams, and sets distances of cut lines which are respectively locus lines of the laser beams between intersection points of viewing angle end lines of the camera unit and locus lines of the laser beams, in the vertical direction, as the plurality of distance measurement ranges; and a distance calculation unit 2 obtains a distances from a reference surface, from the position detection information, and discrimination signal, with reference to a calibration table corresponding to the distance measurement range; and thereby the distance measurement range can be expanded by measuring a plurality of different distance measurement ranges by one camera.

3 Claims, 2 Drawing Sheets

(58) Field of Classification Search
CPC ............ G01B 11/2755; G01B 11/2545; G01B 2210/286; G01B 2210/52; G06T 7/521; Y10T 24/44; Y10T 29/49
USPC .................................................. 356/3.01–5.1
See application file for complete search history.

(56) References Cited

U.S. PATENT DOCUMENTS

| | | | |
|---|---|---|---|
| 7,391,522 B2 * | 6/2008 | Sasaki | G06T 7/521 356/601 |
| 2002/0024677 A1 * | 2/2002 | Metcalfe | G01B 11/245 356/625 |
| 2003/0035100 A1 * | 2/2003 | Dimsdale | G06T 7/80 356/124 |
| 2010/0309483 A1 * | 12/2010 | Crowther | B25B 5/06 356/606 |
| 2010/0315655 A1 | 12/2010 | Behler et al. | |
| 2011/0279670 A1 | 11/2011 | Park et al. | |

FOREIGN PATENT DOCUMENTS

| | | |
|---|---|---|
| TW | 200839919 A | 10/2008 |
| TW | 200909769 A | 3/2009 |

* cited by examiner

[FIG 1]
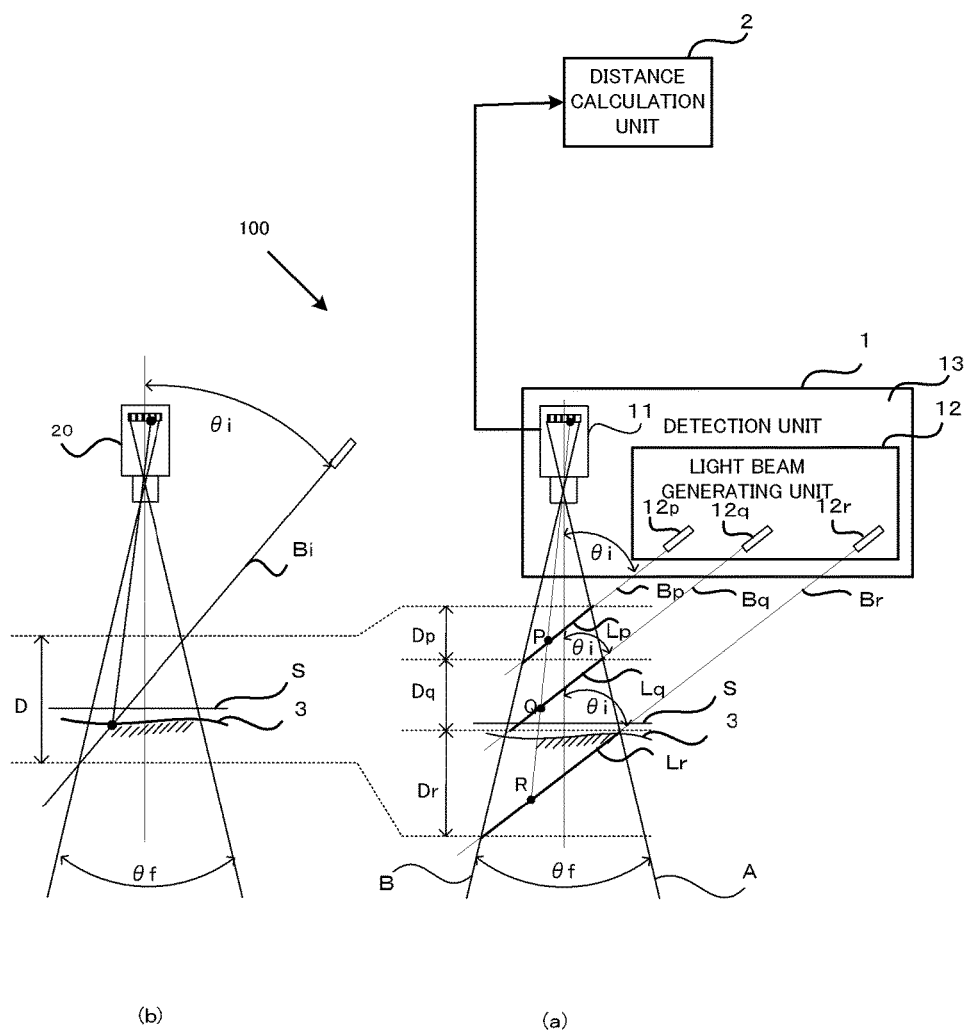
(b) (a)

【FIG 2】
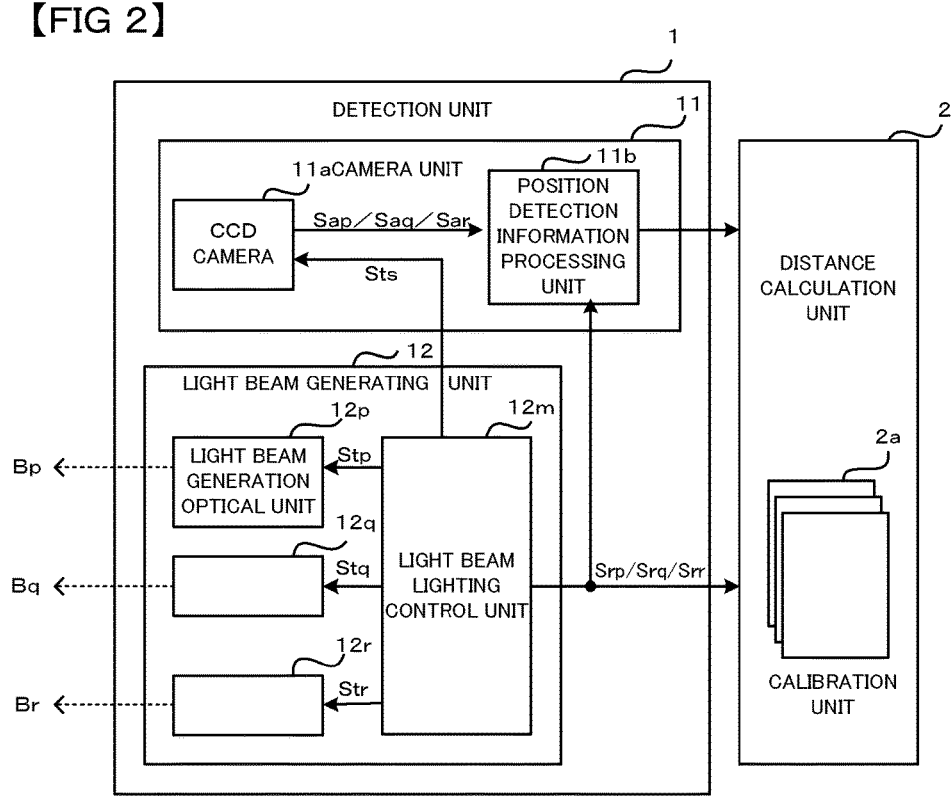
【FIG 3】
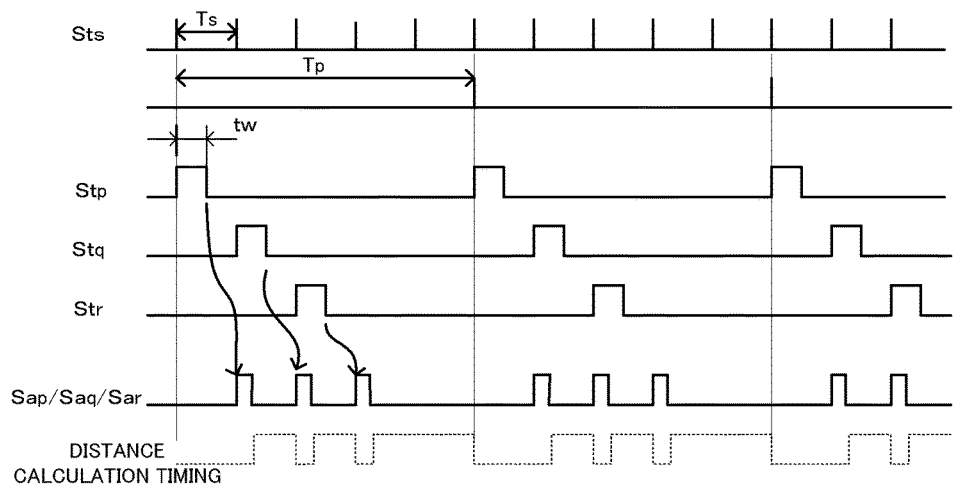

DISTANCE MEASURING APPARATUS

CROSS-REFERENCE TO RELATED APPLICATION

This application is based upon and claims the benefit of priority from the prior Japanese Application No. 2014-047817, filed on Mar. 11, 2014, the entire contents of which are incorporated herein by reference.

FIELD

The present invention relates to an expanding function of the measurement range of an optical distance measuring apparatus.

BACKGROUND

Conventionally, there is an optical distance measuring apparatus which uses a triangulation method to obtain a distance to an object to be measured in a non-contact manner as its measurement principle. This distance measuring apparatus, as shown in FIG. 1(b), for example, installs a camera 20 in the vertical direction to a reference surface of an object 3 to be measured, irradiates the reference surface S of the object 3 to be measured with a laser beam Bi at a prescribed light projection angle θi, and detects the change in a position of the surface of the object 3 to be measured in the vertical direction by the camera 20, as the change in a light receiving position of the reflected light of the laser beam Bi, and thereby obtains a distance of the object 3 to be measured from the position of a reference surface S.

Generally, as the camera 20 used in this case, an area scan type CCD camera, and a line scan type CCD camera in which an optical axis of a laser beam and an optical axis of the camera 20 for light receiving are set so as to be on the same plane are used.

The resolution of such an optical distance measuring apparatus using a triangulation method becomes a value which is obtained by dividing a distance measurement range D of the camera 20 by the number of bits of imaging elements of the CCD camera 20, and accordingly, the measurement range and the resolution are in a trade-off relation.

For this reason, there is an art which irradiates different distance measurement ranges with two laser beams, and discriminates the detection positions of the respective laser beams, to thereby try to expand the measurement range (Refer to Patent Document 1, for example.).

PRIOR ART DOCUMENT

Patent Document

[Patent Document 1] Japanese Patent Application Publication No. 2011-196883

The distance measuring apparatus disclosed in Patent Document 1 is a system which obtains a detection number of two laser beams for discriminating different distance measurement ranges and detection position ranges thereof, and obtains a distance from the difference of the detection patterns of the laser beams, with reference to calibration tables corresponding to the respective distance measurement ranges.

Accordingly, in the case of expanding the distance measurement range, there is a problem that a discrimination processing to discriminate the detection number of the laser beams and the detection position ranges becomes complicated.

The present invention is made to solve the above-described problems, and makes it an object to provide a distance measuring apparatus which can easily perform expansion of a measurement range, without reducing the resolution of the distance measuring apparatus.

A distance measuring apparatus according to the present embodiment is a distance measuring apparatus of an optical triangulation method provided with a detection unit which irradiates a surface of an object to be measured with a laser light, and detects a reflection position of the relevant laser beam by a camera, and a distance calculation unit which receives position detection information of the laser beam detected by the detection unit, and obtains a distance between the object to be measured and a previously set reference position; the distance measuring apparatus is characterized in that the detection unit is provided with: a light beam generating unit provided with a plurality of light beam generation optical units each of which is provided with a laser light source, and a collimator that shapes the laser beam irradiated from the laser light source so as to have a prescribed beam size at an irradiation position, and a light beam lighting control unit which generates pulse signals for lighting a plurality of the laser beams as pulse lights in time series, and generates discrimination signals of the relevant pulse lights; the camera unit provided in the direction orthogonal to the reference surface, which detects positions of the plurality of laser beams reflected from the object to be measured, and generates the position detection information; and an optical setting unit which sets light projecting positions of the plurality of laser beams, and light receiving positions of reflected lights of the laser beams, while fixing the light beam generating unit and the camera unit at previously set positions; the light beam generating unit projects the plurality of laser beams to the relevant reference surface at a predetermined incident angle, in a viewing field space of the camera, for a plurality of distance measurement ranges from the reference surface to divide a previously set distance measurement range, respectively, and sets distances of cut lines which are respectively locus lines of the laser beams between intersection points of viewing angle end lines of the camera unit and locus lines of the laser beams, in the vertical direction of the camera unit, as the plurality of distance measurement ranges respectively; the distance calculation unit is provided with a plurality of previously set calibration tables in each of which a distance from the reference surface is made to correspond to the position detection information of the camera, for each of the plurality of distance measurement ranges, receives the position detection information sent from the camera, and the discrimination signal, and obtains a distance from the reference surface with reference to the calibration table corresponding to the distance measurement range; and thereby the distance measurement range can be expanded by measuring a plurality of different distance measurement ranges by the one camera.

According to the present distance measuring apparatus, it is possible to provide a distance measuring apparatus which can easily perform expansion of a measurement range, without reducing the resolution of the distance measuring apparatus.

BRIEF DESCRIPTION OF THE DRAWINGS

FIG. 1 A configuration diagram of a distance measuring apparatus of an embodiment.

FIG. 2 An explanation diagram of a detailed configuration of the embodiment.

FIG. 3 A time chart diagram for explaining an processing operation of the embodiment.

DETAILED DESCRIPTION

The present embodiment will be described with reference to FIG. 1 to FIG. 3. FIG. 1 is a diagram for contrastingly explaining a configuration of the present embodiment and a setting of an optical system of a distance detection unit 1 shown in FIG. 1(a), and an optical system of a conventional distance measuring apparatus shown in FIG. 1(b).

In addition, FIG. 2 is a block configuration diagram for explaining a detailed configuration of the detection unit 1, and FIG. 3 is a time chart for explaining a processing operation of detection signals of this distance measuring apparatus 100.

The distance measuring apparatus 100 of the present embodiment is an optical distance measuring apparatus using a triangulation method as its measuring principle, and is provided with the detection unit 1 which irradiates a surface of the object 3 to be measured with a laser beam at an incident angle θi for the reference surface S, and detects the reflection position of this laser beam by a camera unit 11 from the vertical direction of the reference surface S of the object 3 to be measured, and a distance calculation unit 2 which receives position detection information of the laser beam detected by the detection unit 1, and obtains a distance between the object 3 to be measured and the previously set reference surface S.

The detection unit 1 is provided with, a light beam generating unit 12 which is provided with a plurality of light beam generation optical units 12p, 12q, 12r each of which is provided with a laser light source not shown, and a collimator not shown which shapes a laser beam irradiated from this laser light source, so that the laser beam has a predetermined beam output, and becomes not more than a predetermined beam size, in a distance measurement range; and a light beam lighting control unit 12m which generates pulse signals Stp, Stq, Str for lighting a plurality of laser beams Bp, Bq, Br that are generated in the respective light beam generation optical units 12p, 12q, 12r in time series as pulse lights, and generates discrimination signals Srp, Srq, Srr of the respective pulse lights.

Here, the symbols p, q, r of the light beam generation optical units 12p, 12q, 13r correspond to the respective laser beams Bp, Bq, Br, and hereinafter, the description will be made similarly, by attaching the similar symbols p, q, r, for the correspondence and discrimination of these laser beams Bp, Bq, Br.

Further, the detection unit 1 is provided with, the camera unit 11 which is provided with a CCD camera 11a that is provided in the direction orthogonal to the reference surface S, and images the plurality of laser beams Bp, Bq, Br reflected from the object 3 to be measured, and a position detection information processing unit 11b that reads positions of the laser beams from detection signal Sap, Saq, Sar of the CCD camera 11a, and generates position detection information; and an optical setting unit 13 which sets light projecting positions of the plurality of laser beams, and light receiving positions of reflected lights of the laser beams, while fixing the light beam generating unit 12 and the camera unit 11 at previously set positions.

In the present embodiment, the case with three laser beams Bp, Bq, Br will be described, but as long as the number of the laser beams is two or more, the number is not limited.

The CCD camera 11a may be any of a line scan type CCD camera, and an area scan type CCD camera, but here, the case of a line scan type CCD camera will be described.

Next, a detailed configuration of the light beam generating unit 12 and a setting method of an optical system thereof will be described. FIG. 1(a) shows a setting example of an optical system in which a conventional distance measurement range D shown in FIG. 1(b) is expanded into a plurality of distance measurement ranges Dp+Dq+Dr.

The respective distance measurement ranges are irradiated with laser beams Bp, Bq, Br from the light beam generation optical units 12p, 12q, 12r, at the prescribed incident angle θi.

And, in a space of a viewing angle θf of the CCD camera 11a, the distances of cut lines Lp, Lq, Lr in the vertical direction are respectively set as the distance measurement ranges Dp, DQ, Dr, here the cut lines Lp, Lq, Lr are respectively locus lines of the laser beams Bp, Bq, Br between intersection points of viewing angle end lines A, B of the CCD camera 11a and the locus lines of the laser beams Bp, Bq, Br.

It is also possible to set the distance measurement ranges Dp, Dq, Dr, so that the distance measurement range Dp overlaps with the distance measurement range Dq, and the distance measurement range Dq overlaps with the distance measurement range Dr, by adjusting the installation intervals of the laser beam generation optical units 12p, 12q, 12r in the horizontal direction.

In addition, the shapes of the laser beams to be generated in the light beam generation optical units 12p, 12q, 12r are collimated so that, in each of the distance measurement ranges Dp, Dq, Dr, the shape thereof becomes a shape of not more than a prescribed size, and regarding the setting of a depth of field of the CCD camera 11a, a focal length and an F value (a stop) of a camera lens of the CCD camera are selected, so that a confusion circle of not more than a previously set measurement resolution is formed, in each of these plurality of distance measurement ranges.

Respective position detection resolutions can be set to values which are obtained by dividing the respective measurement ranges by the number N of bits in the distance measurement direction of the CCD camera 11a, that are, Dp/N, Dq/N, Dr/N.

Next, an operation of the light beam lighting control unit 12m will be described. FIG. 3 is a time chart showing a lighting timing of the laser beams which the light beam lighting control unit 12m controls, and a calculation processing timing of the distance calculation unit 2 which obtains distances in the corresponding distance measurement ranges, from the position detection information detected by the camera unit 11.

In FIG. 3, Ts indicates a scanning cycle of a scanning start signal Sts of one line which becomes a light signal storage time of the CCD camera 11a, and Tp indicate a distance calculation cycle of the distance calculation unit 2 which is synchronized with this scanning start signal Sts.

The light beam lighting control unit 12m sends the pulse signals Stp, Stq, Str, each for generating a prescribed light emitting energy with a prescribed pulse width tw synchronized with the scanning start signal Sts, to the corresponding light beam generation optical units 12p, 12q, 12r, in synchronized with the scanning cycle Ts, in time series, for each calculation cycle.

And, the CCD camera 11a receives the reflected lights of the laser beams which are applied by the pulse signals Stp, Stq, Str and made to emit light, and sequentially sends the detection signals Sap, Saq, Sar to the position detection information processing unit 11b at the respective next scanning cycles of the applied cycles.

In addition, the light beam lighting control unit 12m sends the discrimination signals Srp, Srq, Srr for a calibration table 2a which are respectively synchronized with the pulse signals Stp, Stq, Str to the camera unit 11, and the distance calculation unit 2.

After having received the detection signals Sap, Saq, Sar corresponding to the three pulse signals Stp, Stq, Str, the position detection information processing unit 11b generates position detection information of one or a plurality of the detected detection signals Sap, Saq, Sar and sends it or them to the distance calculation unit 2, within each of the received scanning cycles Ts, or in a timing till the next scanning cycle Ts after receiving the third detection signal Sar.

And, the distance calculation unit 2 is provided with a plurality of the predetermined calibration tables 2a (2ap, 2aq, 2ar) in each of which a distance from the reference surface S is made to correspond to the position detection information of the CCD camera 11a, in each of the plurality of distance measurement ranges, receives the position detection information sent from the position detection information processing unit 11b, and the discrimination signals Srp, Srq, Srr, and obtains distance from the reference surface S based on a previously set calculation expression, with reference to the calibration tables 2a (2ap, 2aq, 2ar) corresponding to the respective distance measurement ranges Dp, Dq, Dr.

Accordingly, in the case of points P, Q, R to be detected on the same light receiving axis shown in FIG. 1(a), it is possible to measure respective distance by discriminating the lighting times of the laser beams Bp, Bq, Br.

According to the distance measuring apparatus 100 configured like this, the position detection information of the laser beams which have been pulse-lighted in time series are discriminated, and the plurality of different distance measurement ranges are measured by one camera, and thereby the distance measurement is enabled for each of the lighting cycles of the laser beams, or in the timing shown by a broken line in FIG. 3 within a calculation cycle, that is the whole lighting cycles of the laser beams+one cycle.

In addition, the geometrical optical condition setting of the light beam generation optical units 12p, 12q, 12r, and the number of lighting circuits of the light beam lighting control unit 12m are arbitrarily selected, and a plurality of the corresponding calibration tables 2a are previously created, and thereby it is possible to select an optional distance measurement range with a simple configuration.

Accordingly, it is possible to provide a distance measuring apparatus which can easily perform the expansion of the measurement range, without reducing the resolution of the distance measuring apparatus, and expands the distance measurement range by measuring a plurality of different distance measurement ranges by one camera.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. In a distance measuring apparatus of an optical triangulation method provided with a detection unit which irradiates a surface of an object to be measured with a laser light, and detects a reflection position of the laser light by a camera, and a distance calculation unit which receives position detection information of the laser light detected by the detection unit, and obtains a distance between the object to be measured and a previously set reference surface, the distance measuring apparatus characterized in that:

the detection unit is provided with:
  a light beam generating unit provided with a plurality of light beam generation optical units each of which is provided with a laser light source, and a collimator that shapes the laser light irradiated from the laser light source so as to have a prescribed beam size at an irradiation position, and a light beam lighting control unit which generates pulse signals for lighting a plurality of the laser lights as pulse lights in time series, and generates discrimination signals of the pulse lights;
  a camera unit provided in a direction orthogonal to the previously set reference surface, which detects positions of the laser light reflected from the object to be measured, and generates the position detection information; and
  an optical setting unit which sets light projecting positions of the plurality of laser lights, and light receiving position of reflected lights of the laser lights, while fixing the light beam generating unit and the camera unit at previously set positions;
the light beam generating unit projects the plurality of laser lights to the surface of the object at a predetermined incident angle to the previously set reference surface, in a viewing field space of the camera, for a plurality of distance measurement ranges to divide a previously set distance measurement range, respectively, and sets distances of cut lines which are respectively locus lines of the laser lights between intersection points of viewing angle end lines of the camera and locus lines of the laser lights, in a vertical direction of the camera unit, as the plurality of distance measurement ranges respectively;
the distance calculation unit is provided with a plurality of previously set calibration tables in each of which a distance from the previously set reference surface is made to correspond to the position detection information of the camera unit, for each of the plurality of distance measurement ranges, receives the position detection information sent from the camera unit, and the discrimination signal, and obtains a distance from the previously set reference surface with reference to the calibration table corresponding to the distance measurement range; and
thereby the distance measurement range can be expanded by measuring a plurality of different distance measurement ranges by the one camera.

2. The distance measuring apparatus as recited in claim 1, wherein the light beam generating unit is provided with: the plurality of light beam generation optical units each of which is provided with the laser light source, and the collimator that shapes the laser light irradiated from the laser light source so that the laser light has a predetermined beam output, and becomes not more than a predetermined beam size, in the distance measurement range; and the light beam lighting control unit which generates the pulse signals for pulse-lighting the respective laser light sources in time series, and generates the discrimination signals of the respective pulse lights.

3. The distance measuring apparatus as recited in claim 1, wherein the camera unit includes a CCD camera of a CCD line scan type as the camera, an optical axis of the laser light and an optical axis of the camera are set so as to be on the same plane, and regarding the setting of a depth of field of the CCD camera, a focal length and an F value of a camera lens of the CCD camera are selected, so that a confusion circle of not more than a previously set measurement resolution is formed, in each of the plurality of distance measurement ranges.

* * * * *